US 6,353,667 B1

(12) United States Patent
Foster et al.

(10) Patent No.: US 6,353,667 B1
(45) Date of Patent: Mar. 5, 2002

(54) MINIMUM INTERRUPTION CYCLE TIME THRESHOLD FOR RESERVE CALL CENTER AGENTS

(75) Inventors: Robin H. Foster, Little Silver, NJ (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/141,273

(22) Filed: Aug. 27, 1998

(51) Int. Cl.⁷ .............................................. H04M 3/00
(52) U.S. Cl. ........................... 379/265.05; 379/265.01; 379/265.02
(58) Field of Search ................................ 379/265, 266, 379/269, 309, 265.01, 265.02, 265.04, 265.05

(56) References Cited

U.S. PATENT DOCUMENTS

| 4,510,351 A | * | 4/1985 | Costello et al. | 379/265.01 |
| 5,185,780 A | * | 2/1993 | Leggett | 379/265.08 |
| 5,206,903 A | | 4/1993 | Kohler et al. | |
| 5,721,770 A | * | 2/1998 | Kohler | 379/266 |
| 5,825,869 A | * | 10/1998 | Brooks et al. | 379/265 |
| 6,058,435 A | * | 5/2000 | Sassin et al. | 379/265 |
| 6,088,441 A | * | 7/2000 | Flockhart et al. | 379/265 |
| 6,141,412 A | * | 10/2000 | Smith et al. | 379/265.14 |

FOREIGN PATENT DOCUMENTS

| EP | 0 817 455 A2 | 1/1998 |
| EP | 0 926 872 A2 | 6/1999 |
| WO | WO 98/06211 | 2/1998 |

* cited by examiner

Primary Examiner—Ahmad Matar
Assistant Examiner—Bing Bui
(74) Attorney, Agent, or Firm—Ryan, Mason & Lewis, LLP

(57) ABSTRACT

A minimum interruption cycle time is established for a reserve agent in a call center. The reserve agent may be an exclusively reserve agent which processes only calls requiring reserve skills. In an illustrative embodiment, after the reserve agent completes the processing of a call, a cycle timer is started for that agent. The delivery of additional calls to the reserve agent is then suspended until the value of the cycle timer is greater than or equal to the established minimum interruption cycle time for that agent. The minimum interruption cycle time is selected so as to allow the reserve agent to complete a designated number of non-call tasks between the calls processed by the reserve agent. If there is a pool of reserve agents, one or more of the reserve agents may be temporarily converted to normal agent status for at least one particular skill that is causing excessive interruption of reserve agents, so as to maintain the minimum interruption cycle time for the remaining reserve agents in the presence of an increased call volume.

23 Claims, 2 Drawing Sheets

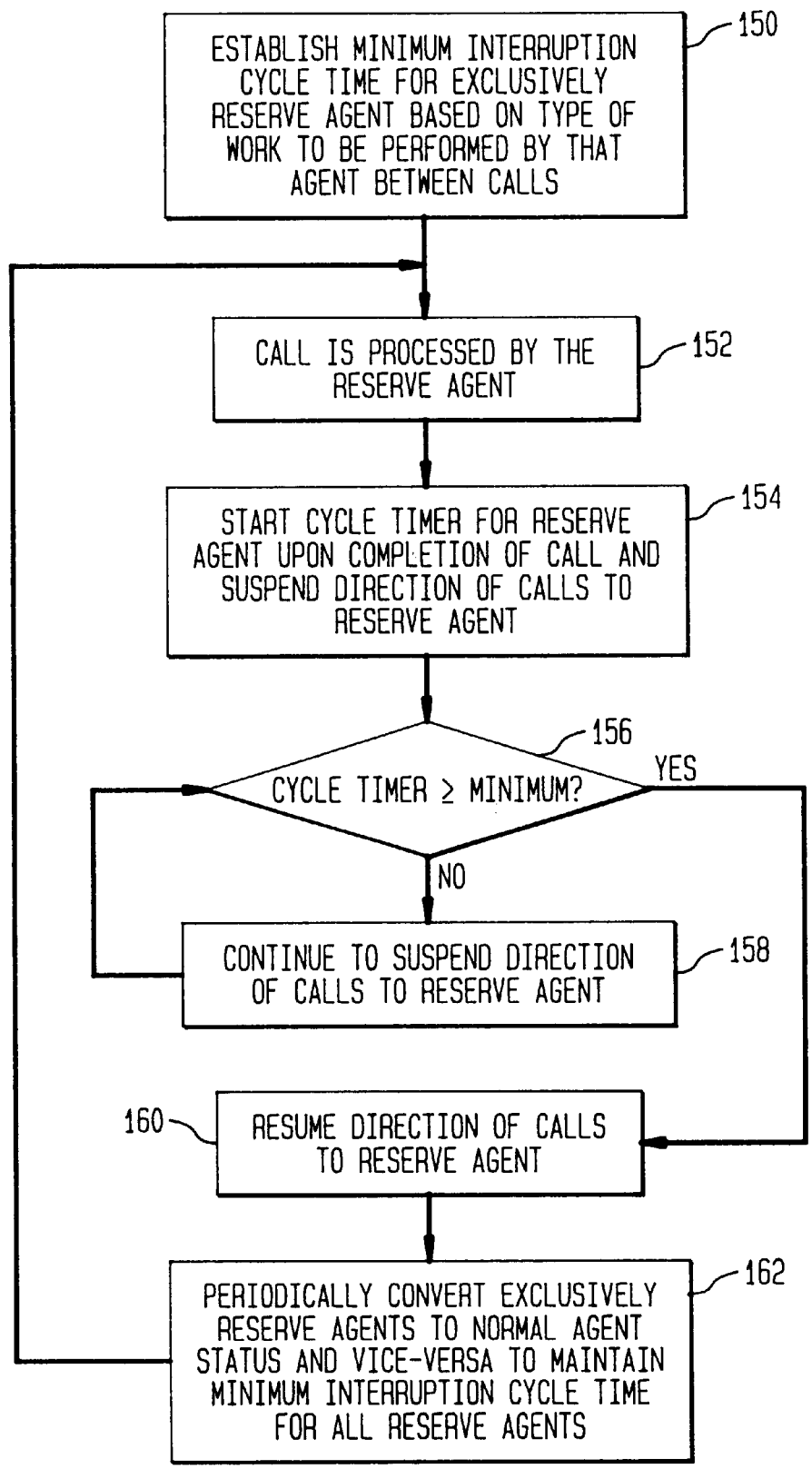

MINIMUM INTERRUPTION CYCLE TIME THRESHOLD FOR RESERVE CALL CENTER AGENTS

FIELD OF THE INVENTION

The invention relates generally to call centers or other call processing systems in which voice calls, e-mails, faxes, voice messages, text messages, Internet service requests and other types of communications are distributed among a number of service agents for handling.

BACKGROUND OF THE INVENTION

Call centers distribute calls and other types of communications to available call-handling service agents in accordance with various predetermined criteria. In existing systems, the criteria for handling a call are often programmable by the operator of the system via a capability known as call vectoring. Typically, when the system detects that an agent has become available to handle a call, the system identifies the call-handling skills of the agent, usually in some order of priority, and delivers to the agent the longest-waiting call that matches the agent's highest-priority skill. Most conventional call distribution techniques generally focus on being "fair" to callers and agents. This fairness is reflected by the standard first-in, first-out call to most-idle-agent call assignment process. The above-noted skills-based queuing improves upon this basic process in that it allows each agent to be placed into a number of different service categories based on the skill types supported by that agent.

Certain of the skills needed to process calls in a typical call center are referred to as "normal" skills, and often include those skills typically required for the majority of calls. Agents having such skills are referred to as agents with normal status for the particular skills, or simply normal agents. Other skills needed to process calls are of the type known as "reserve" skills, and often include skills which tend to be needed less frequently than the normal skills. The distinction between normal and reserve skills for a given agent may vary depending upon the particular skills of that agent. For example, an agent who is multilingual may also be able to speak English, but English could be a reserve skill for that agent, while other languages the agent speaks are the normal skills for that agent. This is because the other languages may be in greater demand and cannot be met by English-only agents. Reserve skills may thus be viewed as any skills which an agent is capable of performing, but which for some reason the agent is not requested to perform unless in the event of call overload or other special situation.

Agents having these reserve skills are referred to as agents with reserve status for the particular skills, or simply reserve agents. Reserve agents can be non-exclusively reserve, i.e., they can also have some normal skills. Agents which have only reserve skills are referred to as "exclusively reserve" agents. These exclusively reserve agents process calls only for the corresponding reserve skills. An exclusively reserve agent will therefore typically be used on an intermittent basis throughout a given work day, in accordance with variations in the volume of calls requiring their particular reserve skills. Typically, such an agent will have one or more other non-call tasks, such as paperwork or supervisory duties, that must be accomplished. However, interrupting these other non-call tasks too frequently may prevent the agent from completing the tasks.

Conventional systems are generally unable to accommodate exclusively reserve agents, as well as other types of reserve agents, in a manner which allows the agents to complete non-call tasks with optimal efficiency. For example, such systems may require a system administrator, manager or supervisor to decide when to convert an exclusively reserve agent to normal agent status. This can be a particularly difficult task in that the exclusively reserve agents may not all be under one person's control or view, and in that each reserve agent may be reserve for several skills, only one of which may be creating an excessive interruption problem.

SUMMARY OF THE INVENTION

The invention solves these and other problems of the prior art by providing a minimum interruption cycle time for reserve call center agents. The invention is applicable to exclusively reserve agents which process only calls requiring reserve skills, but can also be applied to other types of reserve agents. In an illustrative embodiment, after a reserve agent completes the processing of a call, a cycle timer is started for that agent. The delivery of additional calls to the reserve agent is then suspended until the value of the cycle timer is greater than or equal to an established minimum interruption cycle time for that agent. Any of a number of other techniques may also be used for measuring the cycle time for a reserve agent. The minimum interruption cycle time may be selected so as to allow the reserve agent to complete a designated number of non-call tasks between the calls processed by the reserve agent. The invention can be applied not only to voice calls, but also to e-mails, faxes, voice messages, text messages, Internet service requests and other types of communications.

In accordance with another aspect of the invention, in applications in which there are a pool of reserve agents, one or more of the reserve agents may be converted to normal agent status for at least one particular skill that is causing excessive interruption of reserve agents, so as to maintain the minimum interruption cycle time or times for the remaining reserve agents in the presence of an increased call volume. As the call volume decreases, one or more of the converted reserve agents may be restored back to reserve agent status, while the minimum interruption cycle time or times are maintained for all the reserve agents. Alternatively, the number of reserve agents in the pool may be increased so as to maintain the minimum interruption cycle time or times for the remaining reserve agents in the presence of an increased call volume. Different minimum interruption cycle times may be established for each of the reserve agents, based on the types of non-call tasks those agents are required to perform between calls. Other variations are also possible. For example, the maintenance of the minimum interruption cycle time could be limited based on specified criteria, e.g., not maintained during the busiest time of the day, and any conversion of reserve agents to normal status and vice-versa may require approval of a system administrator.

The invention provides a number of advantages over conventional techniques. By providing a minimum time between calls for reserve agents, it ensures that such agents can accomplish non-call tasks with optimal efficiency while also servicing calls requiring reserve skills. Moreover, the invention can be implemented in an automatic manner, thereby avoiding the problems associated with requiring a system administrator, manager or supervisor to decide when to convert an exclusively reserve agent to normal agent status in order to prevent excessive interruption. These and other features and advantages of the present invention will become more apparent from the accompanying drawings and the following detailed description.

BRIEF DESCRIPTION OF THE DRAWINGS

FIG. 3 is a flow diagram illustrating steps involved in implementing a cycle time threshold for reserve call center agents in accordance with the invention.

DETAILED DESCRIPTION OF THE INVENTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be can be used with automatic call distribution (ACD) systems, telemarketing systems, private-branch exchange (PBX) systems, computer-telephony integration (CTI)-based systems, as well as in combinations of these and other types of call centers. The term "call center" as used herein is thus intended to include any type of ACD system, telemarketing system or other communication system which processes calls or other service requests, including voice calls, video calls, multimedia calls, e-mail, faxes, voice messages or paging massages as well as various combinations of these and other types of communications. The term "reserve agent" as used herein is intended to include any agent which handles communications requiring a reserve skill. One type of reserve agent is an exclusively reserve agent, i.e., an agent handling only those communications which require a reserve skill. Another type of reserve agent is a non-exclusively reserve agent, i.e., an agent handling communications which require a reserve skill as well as communications which require a normal skill. As noted above, a "reserve skill" refers generally to any skill which a given agent is capable of performing, but which for some reason the agent is not requested to perform unless in the event of call overload or other special situation. A "normal skill" refers generally to any skill which is routinely performed by a given agent as part of that agent's usual duties. The "completion" of a communication may refer, for example, to the actual termination of a two-way voice communication, or the time at which an agent completes any required after-call work associated with the communication, or the time at which an agent completes a designated portion of any such after-call work.

Figure 1:
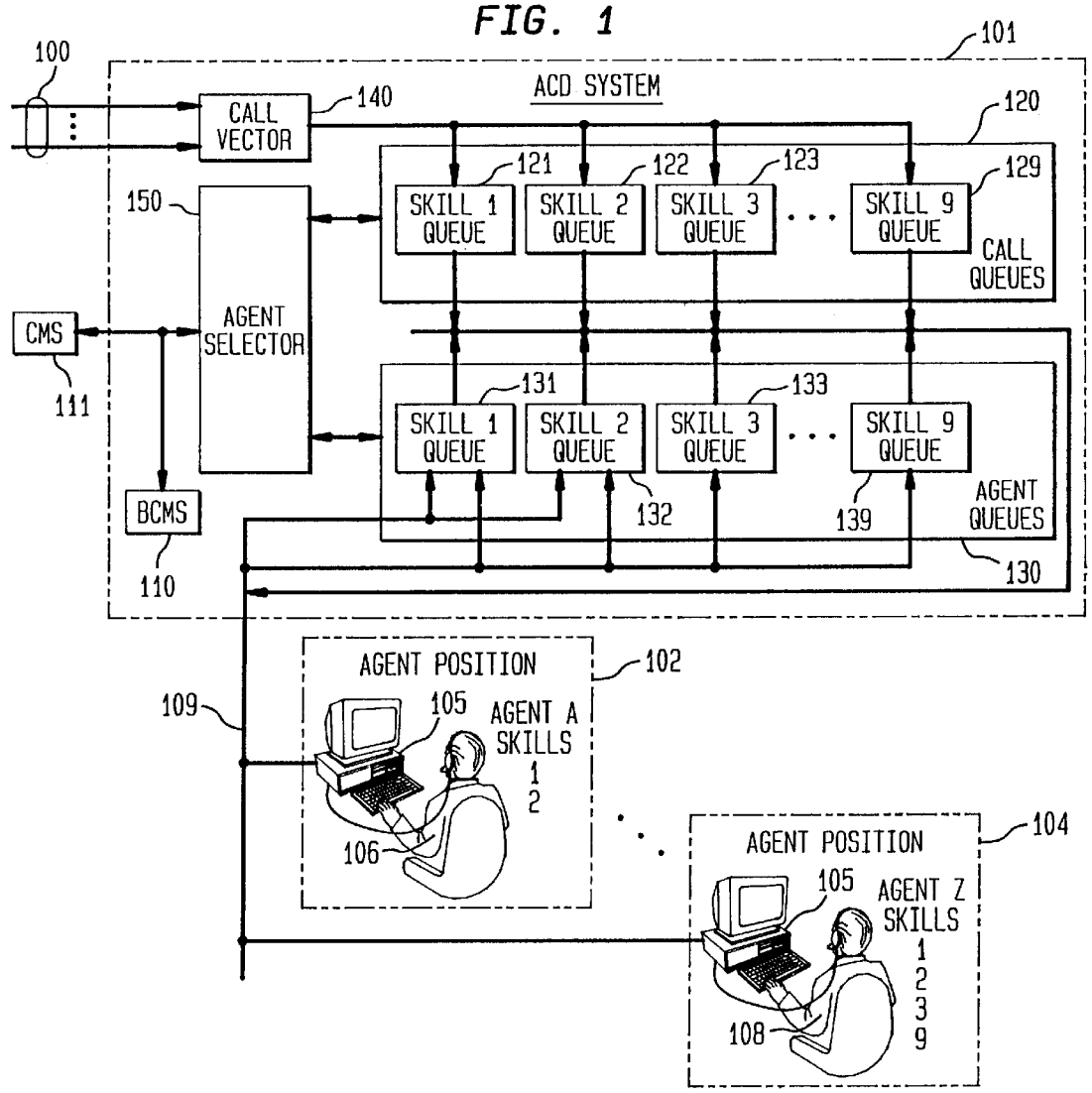
FIG. 1 is a block diagram of a call center that incorporates an illustrative embodiment of a cycle time threshold in accordance with the invention.

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional call management system (CMS) 111. The BCMS 110 and CMS 111 gather call records, call center statistics and other information for use in managing the call center, generating call center reports, and performing other functions. Each of the agents 106-108 may be designated as a normal agent, a reserve agent or an exclusively reserve agent, depending on the particular skills supported by the agents. As noted previously, normal agents support normal skills, reserve agents support normal skills and reserve skills, and exclusively reserve agents support only reserve skills.

Figure 2:
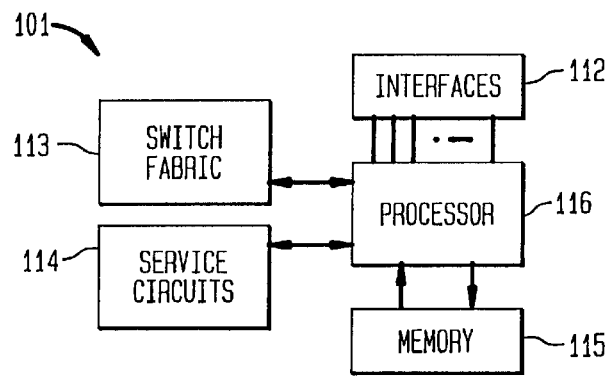
FIG. 2 is a block diagram of an automatic call distribution (ACD) system of the call center of FIG. 1.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various combinations thereof) for executing the stored control programs to control the interfaces and the fabric and to provide automatic call distribution functionality. As will be described in greater detail below, various elements of the ACD system 101 may be used to implement a cycle time threshold for reserve call center agents.

Referring again to FIG. 1, exemplary data stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. These skills may be normal skills or reserve skills. At least one of the call queues 121–129 and at least one of the agent queues 131–139 in this illustrative embodiment of the invention corresponds to a reserve skill. As in a conventional system, calls are prioritized, and either are enqueued in individual ones of the call queues 120 in their order of priority, or are enqueued in different ones of a plurality of call queues that correspond to a skill and each one of which corresponds to a different priority. Similarly, each agent's skills are prioritized according to his or her level of expertise in that skill, and agents either are enqueued in individual ones of the agent queues 130 in their order of expertise level, or are enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 is one type of stored control program implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels. Call vectoring is described in greater detail in Definity® Communications System Generic 3 Call Vectoring/Expert Agent Selection (EAS) Guide, AT&T Publication No. 555-230-520, Issue 3, November 1993, which is incorporated by reference herein. Skills-based ACD techniques are described in greater detail in, for example, U.S. Pat. No. 5,206,903, which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer-readable medium associated with system 101, and executed by processor 116 or other suitable processing hardware associated with the ACD system 101. Selector 150 in this exemplary embodiment implements conventional techniques for providing an assignment between available calls and available agents, and also implements a minimum interruption cycle time process for reserve agents, as will be described in greater detail below in conjunction with FIG. 3. The conventional techniques implemented by selector 150 are well known in the art and will not be further described herein. The remaining description will focus on the minimum interruption cycle time process for reserve agents as implemented by selector 150. It should be noted that the minimum interruption cycle time process could be implemented in other elements of the ACD system 101, or using a combination of a number of different elements in such a system.

FIG. 3 is a flow diagram illustrating the operation of a minimum interruption cycle time for reserve agents, in accordance with an exemplary embodiment of the invention. Although this embodiment will be described for an exclusively reserve call center agent, the techniques can also be applied to any other type of reserve agent. In step 150, a minimum interruption cycle time is established for an exclusively reserve agent based on the type of work to be performed by that agent between calls. As noted previously, such an agent will typically have one or more other non-call tasks, such as paperwork or supervisory duties, that must be accomplished in between calls. Interrupting these other non-call tasks too frequently prevents the agent from completing them. The minimum interruption cycle time established in step 150 is designed to allow a given reserve agent to complete a designated number of non-call tasks between the calls processed by that agent. For example, if the reserve agent performs a non-call task that can be completed in a few seconds, a minimum interruption cycle time of about one minute may be appropriate because substantial progress can be made by completing a number of the non-call tasks between calls. If the reserve agent performs a non-call task that takes several minutes, then interrupting that agent more than once every fifteen minutes might permanently halt the progress of the non-call work of that agent. The minimum interruption cycle time established in step 150 will therefore depend on the type of non-call tasks performed by the reserve agent, and different values may be used for different reserve agents.

In step 152 of the FIG. 3 process, a call is processed by the reserve agent whose minimum interruption cycle time was established in step 150. In step 154, a cycle timer is started upon completion of the call, or alternatively upon completion of any after-call work necessary to complete the processing of the call, and the further direction of calls to that agent is temporarily suspended. This suspension will generally mean that the reserve agent is removed from one or more of the agent queues 131–139 corresponding to its particular reserve skills. Other techniques could also be used to suspend temporarily the direction of calls to the reserve agent. Although in this embodiment the cycle timer is started for the reserve agent upon completion of the current call, it should be noted that this is by way of example and not limitation. In other embodiments, the cycle timer could be started upon receipt of the call by the reserve agent, at some designated point during the call, or at any other suitable time.

Step 156 determines whether or not the cycle timer value is greater than the minimum interruption cycle time for the reserve agent. If the cycle timer value is not greater than the minimum interruption cycle time, the process in step 158 continues to suspend the direction of calls to the reserve agent. Once the cycle timer value increases to the point that it is greater than or equal to the minimum interruption cycle time, the direction of calls to the reserve agent resumes in step 160. This will generally mean that the reserve agent is again placed into one or more of the agent queues 131–139 corresponding to its particular reserve skills, although other techniques could also be used to provide suspension and resumption of calls to the reserve agent.

Step 162 indicates that the process may also involve periodically converting one or more exclusively reserve agents to normal agents and vice-versa, as required to maintain the established minimum interruption cycle time for the remaining exclusively reserve agents. For example, if the call center includes a pool of exclusively reserve agents, then one or more of these agents may be temporarily converted to have normal agent status in a particular skill or skills which are causing excessive interruption. The converted agent or agents then take the brunt of the workload off the remaining exclusively reserve agents, such that the remaining agents can resume effective work on their non-call tasks. The invention thus recognizes that it is generally better to let one or a few exclusively reserve agents drop their non-call tasks completely than to have all exclusively reserve agents become ineffective in their non-call tasks. When the number of calls to the particular skill or skills decreases, those agents that were temporarily converted from exclusively reserve to normal status can be restored to exclusively reserve status. This conversion and restoration can take place either with or without the approval of a call center administrator, manager or supervisor.

As an alternative, rather than temporarily convert one or more exclusively reserve agents to normal status, the call center system could, again with or without approval of a call center administrator, manager or supervisor, add one or more additional agents into the pool of exclusively reserve agents. A larger pool of exclusively reserve agents will tend to expand the time between calls for all of these agents. As another alternative, the system could alter the call volume levels at which the exclusively reserve agents begin to be used.

The above-described embodiments of the invention are intended to be illustrative only. The exemplary configuration of the call center shown in FIG. 1 may be altered to incorporate a wide variety of different arrangements of components to provide the call processing functions described herein. For example, the maintenance of the minimum interruption cycle time could be limited based on specified criteria, e.g., not maintained during the busiest time of the day. As another example, any conversion of reserve agents to normal status and vice-versa may require approval of a system administrator, manager or supervisor. Moreover, as previously noted, the invention can be applied to many different types of communications, including faxes and e-mails.

In alternative embodiments, the cycle time for a given reserve agent may be measured using techniques other than the timer-based techniques of the illustrative embodiment of FIG. 2. In addition, the cycle time threshold for a given reserve agent may be assigned administratively during design of the call handling process, or it may be assigned through an application such as a computer-telephony integration (CTI) application which accesses information needed to make a determination of a suitable cycle time. Other embodiments may implement the described minimum interruption cycle time in one or more call center elements other than an agent selector. Furthermore, it should be noted that the invention may be implemented in the form of a computer-readable medium containing software which, when executed by a computer or other suitable type of processor, will cause the processor to implement the processing functions described above. For example, the BCMS 110, call vector 140, agent selector 150 and other elements of ACD system 101 may each be implemented as one or more software programs stored in memory 115 or any other computer-readable medium associated with the ACD system 101, and executed by processor 116 or other processing hardware associated with the ACD system 101. These and numerous other alternative embodiments within the scope of the following claims will be apparent to those of ordinary skill in the art.

What is claimed is:

1. A method of processing communications in a call center including a plurality of agents, wherein at least a subset of the agents are at least temporarily designated as exclusively reserve agents, the exclusively reserve agents being configured to perform communication processing tasks and non-communication processing tasks but having as a primary responsibility the performance of the non-communication processing tasks, the method comprising the steps of:
   determining a minimum interruption cycle time for at least one of the exclusively reserve agents for performance of the non-communication processing tasks;
   measuring an amount of time from completion of a communication processed by the exclusively reserve agent; and
   suspending delivery of at least one subsequent communication to the exclusively reserve agent based at least in part on whether the measured amount of time is less than the minimum interruption cycle time for performance of the non-communication processing tasks.

2. The method of claim 1 wherein the determining step includes determining the minimum interruption cycle time so as to allow the exclusively reserve agent to complete a designated amount of non-communication task activity between communications processed by the exclusively reserve agent.

3. The method of claim 1 wherein the step of measuring an amount of time includes starting a timer when the exclusively reserve agent has completed processing the communication, and stopping the timer when the subsequent communication is being considered for direction to the exclusively reserve agent.

4. The method of claim 1 wherein the step of measuring an amount of time includes starting a timer when the exclusively reserve agent receives the communication, and stopping the timer when the subsequent communication is being considered for direction to the exclusively reserve agent.

5. The method of claim 1 wherein the step of suspending delivery of at least one subsequent communication to the exclusively reserve agent includes removing the exclusively reserve agent from a pool of agents considered for processing communications.

6. The method of claim 1 further including the step of converting at least one of the exclusively reserve agents to normal agent status for at least one particular skill that is causing excessive interruption of exclusively reserve agents, so as to maintain the minimum interruption cycle time for the remaining exclusively reserve agents in the presence of an increased volume of communications.

7. The method of claim 6 further including the step of restoring at least one exclusively reserve agent which was assigned normal agent status for the at least one particular skill back to exclusively reserve agent status while maintaining the minimum interruption cycle time for the other exclusively reserve agents.

8. The method of claim 1 further including the step of increasing the number of exclusively reserve agents so as to maintain the minimum interruption cycle time for all of the exclusively reserve agents in the presence of an increased volume of communications.

9. An apparatus for processing communications in a call center including a plurality of agents, at least a subset of which are at least temporarily designated as exclusively reserve agents, the exclusively reserve agents being configured to perform communication processing tasks and non-communication processing tasks but having as a primary responsibility the performance of the non-communication processing tasks, the apparatus comprising:
   a memory for storing a minimum interruption cycle time for at least one of the exclusively reserve agents for performance of the non-communication processing tasks; and
   a processor associated with the memory and operative to measure an amount of time from completion of a communication processed by the exclusively reserve agent, and to suspend delivery of at least one subsequent communication to the exclusively reserve agent based at least in part on whether the measured amount of time is less than the minimum interruption cycle time for performance of the non-communication processing tasks.

10. The apparatus of claim 9 wherein the minimum interruption cycle time is determined so as to allow the exclusively reserve agent to complete a designated amount of non-communication task activity between communications processed by the exclusively reserve agent.

11. The apparatus of claim 9 wherein the processor is operative to start a timer when the exclusively reserve agent has completed processing the communication, and to stop the timer when the subsequent communication is being considered for direction to the exclusively reserve agent.

12. The apparatus of claim 9 wherein the processor is operative to start a timer when the exclusively reserve agent receives the communication, and to stop the timer when the subsequent communication is being considered for direction to the exclusively reserve agent.

13. The apparatus of claim 9 wherein the processor suspends delivery of communications to the exclusively reserve agent by removing the exclusively reserve agent from a pool of agents considered for processing communications.

14. The apparatus of claim 9 wherein the processor is further operative to convert at least one of the exclusively reserve agents to normal agent status for at least one particular skill that is causing excessive interruption of exclusively reserve agents, so as to maintain the minimum interruption cycle time for the remaining exclusively reserve agents in the presence of an increased volume of communications.

15. The apparatus of claim 9 wherein the processor is further operative to restore at least one exclusively reserve agent which was assigned normal agent status for the at least one particular skill back to exclusively reserve agent status while maintaining the minimum interruption cycle time for the other exclusively reserve agents.

16. A computer-readable medium containing software for processing communications in a call center including a plurality of agents, wherein at least a subset of the agents are at least temporarily designated as exclusively reserve agents, the exclusively reserve agents being configured to perform communication processing tasks and non-communication processing tasks but having as a primary responsibility the performance of the non-communication processing tasks, wherein the software, when executed in a processor, causes the processor to perform the steps of:

determining a minimum interruption cycle time for at least one of the exclusively reserve agents for performance of the non-communication processing tasks;

measuring an amount of time from completion of a communication processed by the exclusively reserve agent; and suspending delivery of at least one subsequent communication to the exclusively reserve agent based at least in part on whether the measured amount of time is less than the minimum interruption cycle time for performance of the non-communication processing tasks.

17. The computer-readable medium of claim 16 wherein the software further causes the processor to perform the step of converting at least one of the exclusively reserve agents to normal agent status for at least one particular skill that is causing excessive interruption of exclusively reserve agents, so as to maintain the minimum interruption cycle time for the remaining exclusively reserve agents in the presence of an increased volume of communications.

18. A method of processing communications in a call center including a plurality of agents, wherein at least a subset of the agents are at least temporarily designated as exclusively reserve agents, the exclusively reserve agents being configured to receive processing tasks from at least a first source and a second source but having as a primary responsibility performance of the processing tasks from the first source, at least a portion of the processing tasks received from the first source including non-communication processing tasks, the method comprising the steps of:

determining a minimum interruption cycle time for at least one of the exclusively reserve agents for performance of the processing tasks received from the first source;

measuring an amount of time from completion of a communication received from the second source and processed by the exclusively reserve agent; and suspending delivery of at least one subsequent communication from the second source to the exclusively reserve agent based at least in part on whether the measured amount of time is less than the minimum interruption cycle time for performance of the processing tasks received from the first source.

19. An apparatus for processing communications in a call center including a plurality of agents, at least a subset of which are at least temporarily designated as exclusively reserve agents, the exclusively reserve agents being configured to receive processing tasks from at least a first source and a second source but having as a primary responsibility performance of the processing tasks from the first source, at least a portion of the processing tasks received from the first source including non-communication processing tasks, the apparatus comprising:

a memory for storing a minimum interruption cycle time for at least one of the exclusively reserve agents for performance of the processing tasks received from the first source; and a processor associated with the memory and operative to measure an amount of time from completion of a communication received from the second source and processed by the exclusively reserve agent, and to suspend delivery of at least one subsequent communication from the second source to the exclusively reserve agent based at least in part on whether the measured amount of time is less than the minimum interruption cycle time for performance of the processing tasks received from the first source.

20. A computer-readable medium containing software for processing communications in a call center including a plurality of agents, wherein at least a subset of the agents are at least temporarily designated as exclusively reserve agents, the exclusively reserve agents being configured to receive processing tasks from at least a first source and a second source but having as a primary responsibility performance of the processing tasks from the first source, at least a portion of the processing tasks received from the first source including non-communication processing tasks, wherein the software, when executed in a processor, causes the processor to perform the steps of:

determining a minimum interruption cycle time for at least one of the exclusively reserve agents for performance of the processing tasks received from the first source;

measuring an amount of time from completion of a communication received from the second source and processed by the exclusively reserve agent; and suspending delivery of at least one subsequent communication from the second source to the exclusively reserve agent based at least in part on whether the measured amount of time is less than the minimum interruption cycle time for performance of the processing tasks received from the first source.

21. A method of processing communications in a call center including a plurality of agents, wherein at least a subset of the agents are at least temporarily designated as exclusively reserve agents, the exclusively reserve agents being configured to perform at least two different types of processing tasks including a first type of processing task and a second type of processing task but having as a primary responsibility performance of the first type of processing task, the method comprising the steps of:

determining a minimum interruption cycle time for at least one of the exclusively reserve agents for performance of the first type of processing task;

measuring an amount of time from completion of a communication processed by the exclusively reserve agent, the communication being associated with the second type of processing task; and suspending delivery of at least one subsequent communication associated with the second type of processing task to the exclusively reserve agent based at least in part on whether the measured amount of time is less than the minimum interruption cycle time for performance of the first type of processing task.

22. An apparatus for processing communications in a call center including a plurality of agents, at least a subset of which are at least temporarily designated as exclusively reserve agents, the reserve agents being configured to perform at least two different types of processing tasks including a first type of processing task and a second type of processing task but having as a primary responsibility performance of the first type of processing task, the apparatus comprising:

a memory for storing a minimum interruption cycle time for at least one of the exclusively reserve agents for performance of the first type of processing task; and a processor associated with the memory and operative to measure an amount of time from completion of a communication processed by the exclusively reserve agent, the communication being associated with the second type of processing task, and to suspend delivery of at least one subsequent communication associated with the second type of processing task to the exclusively reserve agent based at least in part on whether the measured amount of time is less than the minimum interruption cycle time for performance of the first type of processing task.

23. A computer-readable medium containing software for processing communications in a call center including a plurality of agents, wherein at least a subset of the agents are at least temporarily designated as exclusively reserve agents, the exclusively reserve agents being configured to perform at least two different types of processing tasks including a first type of processing task and a second type of processing task but having as a primary responsibility performance of the first type of processing task, wherein the software, when executed in a processor, causes the processor to perform the steps of:

determining a minimum interruption cycle time for at least one of the exclusively reserve agents for performance of the first type of processing task;

measuring an amount of time from completion of a communication processed by the exclusively reserve agent, the communication being associated with the second type of processing task; and suspending delivery of at least one subsequent communication associated with the second type of processing task to the exclusively reserve agent based at least in part on whether the measured amount of time is less than the minimum interruption cycle time for performance of the first type of processing task.

* * * * *